March 20, 1928.
J. LEDWINKA
1,663,521
PRESSED METAL VEHICLE DOOR
Filed March 5, 1927
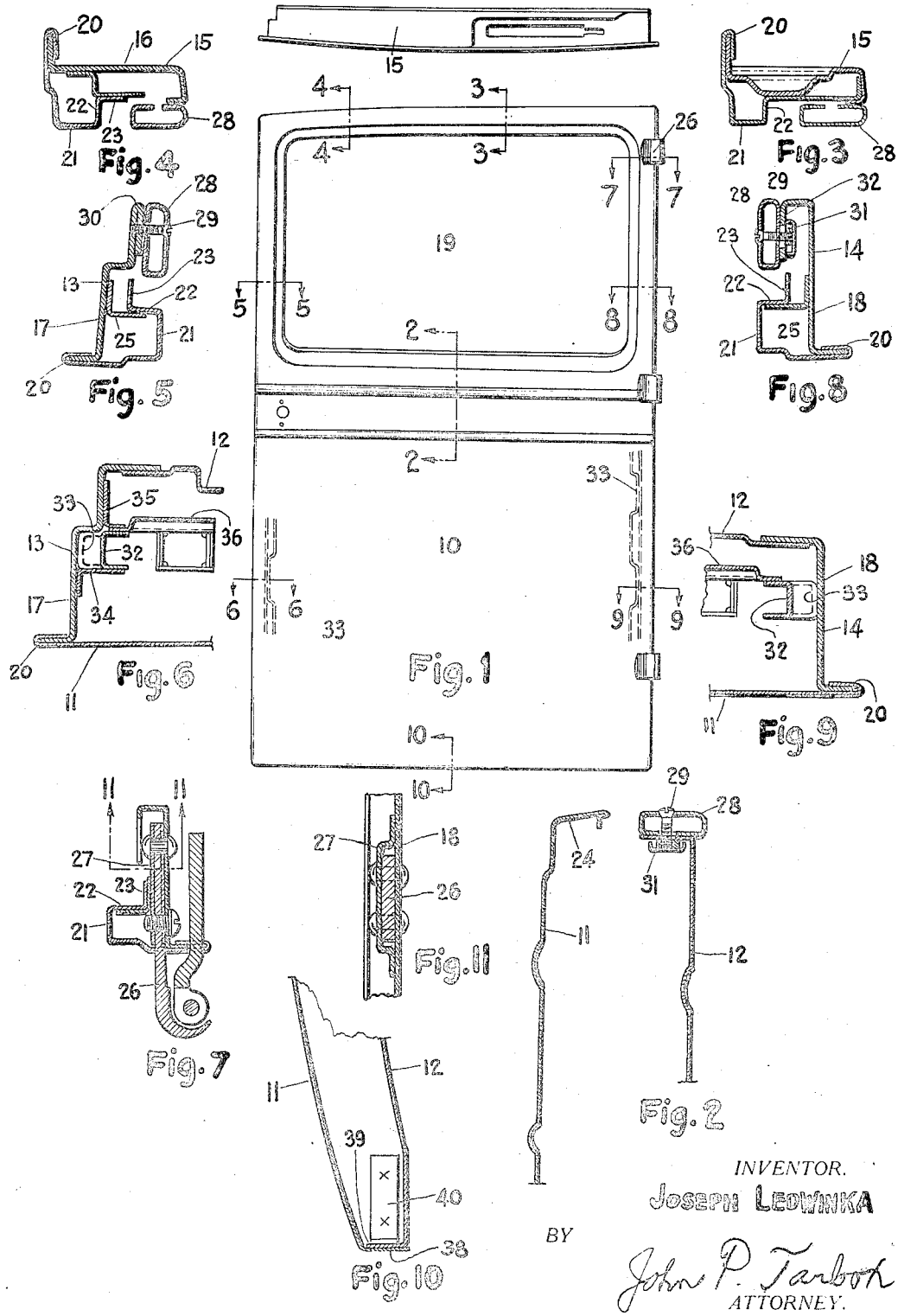
INVENTOR.
JOSEPH LEDWINKA
BY John P. Tarbox
ATTORNEY.

Patented Mar. 20, 1928.

1,663,521

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

PRESSED-METAL VEHICLE DOOR.

Application filed March 5, 1927. Serial No. 172,937.

This invention relates to doors for automobile bodies and more particularly to all-metal doors designed for use in connection with closed automobile bodies such as the sedan or coupé type.

In the design of automobile doors of the type which extends from the body or door sill to the top of the vehicle, consideration must be had of several important features. The door must be strong enough and sufficiently rigid to withstand the severe stresses and strains to which it is ordinarily subjected when in use and yet it must be light enough in weight so as not to unduly increase the total weight of the automobile body.

Another important feature which must not be overlooked by the designer of automobile bodies is the attainment of a maximum degree of vision or, in other words, the door must be so designed as to provide only a minimum of opaque projection so as to eliminate as far as is practicable that serious and dangerous condition known as "blind spots".

A still further consideration which must be taken care of is that which relates to details and economies of manufacture, it being necessary to so form the several elements which make up the completely assembled door as to reduce the cost of manufacture as well as the time necessary for assembling the door.

The present invention has as one of its primary objects the provision of a door which is strong, durable and rigid and yet as light in weight as is possible without sacrificing any strength thereof.

A further object of the invention is the provision of a door for use in closed automobile bodies, the frame construction of which on opposite sides of the window opening reduces to considerable degree the opaque projection, such that a maximum vision through the door is assured to the occupants of the automobile.

A still further object is the provision of an all-metal door, the upper portions of the side rails of which are of substantially box girder construction, this construction being such as assures a maximum degree of strength to the rails without, however, reducing to any material extent the effective width of the window opening.

A still further object of the invention is the provision of glass runs for guiding the window glass as it is raised or lowered, these glass runs being so constructed as to add to the strength and rigidity of the door frame.

A still further object of the invention is the provision of hinges, the swinging elements of which are secured to the inner surface of the hinge rail of the door, thus insuring a neat and finished external appearance to said hinge rail.

Other objects and objects relating to details of economy, construction and assembly will appear more fully hereinafter, and a structure constituting a preferred embodiment of the invention is illustrated in the accompanying drawings forming a part of this application, in which:

Figures 1 and 1ª are views in elevation and in plan, respectively, showing the external appearance of the door;

Figure 2 is a section taken on the line 2—2 of Fig. 1;

Figures 3 and 4 are sections taken on the lines 3—3 and 4—4, respectively, of Figure 1;

Figures 5 and 6 are sections taken along the lines 5—5 and 6—6, respectively, of Figure 1;

Figures 7 to 9 are sections taken along the lines 7—7, 8—8 and 9—9, respectively, of Figure 1;

Figure 10 is a section taken on the line 10—10 of Figure 1; and

Figure 11 is a section taken on the line 11—11 of Figure 7.

Referring more particularly to the drawings, the door, designated generally by the reference numeral 10, consists of an electrically welded frame work of pressed metal stampings over the outer and inner surfaces of which are secured the outer panel 11 and the inner panel 12. The skeleton frame work upon which these panels 11 and 12 are secured includes the vertically extending side rails 13 and 14, the rail 13 being of substantially double-Z cross section and constituting the jamb rail of the door and the rail 14 being of substantially simple Z cross section and constituting the hinge rail of the door. Interconnecting the upper ends of the side rails 13 and 14 is the top rail 15. This top rail is also of substantially Z cross section, the main web 16 of which lies in a horizontal plane with the opposite ends thereof making butt joints with the transversely disposed main webs 17 and 18, respectively, of the vertically extending side rails 13 and 14. The butt-joints so formed are preferably gas welded.

The outer panel 11 is preferably in the form of a one-piece stamping, the upper portion of which is provided with an opening 19 constituting the window of the door. As most clearly appears in Figures 3, 4, 5, 6, 8 and 9, the side and upper extremities of this panel are clinched or crimped, as at 20, over the outer branches of the side and top rails 13, 14 and 15, all of which branches lie in the common outer plane of the door. The edges of the panel 11 which define the sides and top of the window opening 19 are turned inwardly, as at 21, across the plane of said opening and thence in a direction paralleling said plane, as at 22, the free inner edges of the panel 11 finally terminating in the flanges 23 spaced from but paralleling the webs 17, 18 and 16 of the rails 13, 14 and 15, respectively. The bottom edge of the window opening 19 is defined by the substantially horizontally extending flange 24 of the panel 11, this flange 24 being an integral continuation of the side and top portions 21.

In order to maintain securely and with rigidity the portions of the panel which define the window opening, resort is had to angle members 25, one branch of which is secured, as by welding, to the inner surface of the main web of the side rail and the other branch of which overlies and is secured, also by welding, to the vertically extending branch 22 of the panel 11. Ready access for welding the angle members 25 to the main webs of the side rails is had through suitable openings provided in the flanges 23. These angle members 25 are provided at either side of the window opening, each being of a length almost equal to the vertical height of said opening. The angle member 25, however, which is attached to the hinge rail 14, terminates at a point below the upper hinge 26, this hinge being secured, as shown in Figure 7, to the inner surface of the hinge rail by means of rivets or screws passing through the hinge and into a clip member 27 overlying the same and provided with flanges welded to the web 18 of said rail. The intermediate and lower hinges are secured to the hinge rail in similar manner.

The sliding window (not shown) which is normally housed in the bottom of the door in the chamber formed by the inner and outer panels 11 and 12 is inserted into the window opening 19 by a lateral movement, the vertically extending portions 22 and 23 of the panel 11 constituting, respectively, the outer and base walls of the upper sections of the glass run channels. The inner walls of these upper channel sections are provided upon securing in position the one-piece molding 28 which latter is securely held in position by means of retaining screws 29. In the case of the jamb rail, the inner branch thereof is doubled over as indicated at 30 to provide greater strength, a better interior finish and a more secure purchase for these screws, while in the case of the hinge rail adjustably mounted nuts 31 are suitably arranged upon the inner surface of the reversely bent portion 32 thereof for receiving the retaining screws 29. This reversely bent portion 32 constitutes the inner portion of the rail of channel section of a width approximately equal to the offset portion of the jamb rail and the doubled over inner branch thereof. Similarly arranged nuts are provided upon the inturned flange at the upper edge of the inner panel 12, the free edge of this flange being spaced from the corresponding edge of the flange 24 of the panel 11 to permit the free passage of the window glass therebetween.

The lower glass runs for the window, that is, the glass run channels for receiving the side edges of the window glass when the latter is in its lowered position or is in the process of moving downwardly, are in the shape of vertically extending channel members 32 which extend from a point just above the line of the lower hinge to approximately the belt line of the door. Intermediate lengths of the channels 32 are offset as at 33 to permit their being welded to the inner surfaces of the main webs 17 and 18 of the jamb and hinge rails, respectively, the greater portions of the base walls of these channels being, however, spaced from the webs 17 and 18 for substantial vertical alignment with the base walls 23 of the upper glass runs. Clip members 34 and 35 of substantially angle cross section are provided at suitable intervals for interconnecting the respective side walls of the channels 32 to the main webs of the side rails 13 and 14. Buffers or cushions upon which the lower edge of the window glass rests when the glass is in its lowered position are supported from the lower ends of the glass run channels 32 by means of the bracket members 36, the free ends of these members being provided with sockets 37 for the buffers or cushions lying substantially in the plane of the path of movement of the window glass.

It will be noted that this construction of door dispenses with the more or less usual bottom rail, the bottom of the door in this case being formed simply by overlapping and welding together the flanges 38 and 39 provided at the bottom edges of the outer and inner panels 11 and 12, respectively.

The bottom corners of the door are further jointed together by angle members or straps 40, the vertical branches of which are welded to the inner surfaces of the webs 17 and 18 of the side rails and the horizontal branches of which are welded to the bottom flange 39 of the inner panel 12.

By the foregoing construction, a door structure for closed vehicle bodies is attained in which the sides and top of the window frame in the upper region of the door are of substantially the same width, see Figs. 1, 4, 5 and 8, and this results in an improved appearance of the exterior of the door, the door parts being substantially symmetrically arranged about a vertical transverse plane therethrough.

It is, of course, to be understood that various modifications and changes may be made of the construction herein described without departing from the spirit or principles of the invention, and it is accordingly desired to claim the same broadly as well as specifically as indicated in the appended claims.

What is claimed as new and useful is:

1. In an automobile door construction, a jamb rail of substantially double Z cross section extending substantially the full length of the door, the inner branch of said rail above the belt line of the door being folded back upon the web of said rail, a molding member overlying the inner surface of the folded back portion of said rail, and means for detachably securing said member in position.

2. In an automobile door construction, a hinge rail of substantially Z cross section extending substantially the full length of the door, the inner branch of said rail above the belt line of the door being provided with a reversely bent portion spaced from but paralleling the web of said rail, a molding member overlying the inner surface of said reversely bent portion, and means for detachably securing said member in position.

3. In an automobile door construction, a pressed metal frame work including side and top rails, each of said rails including reversely bent portions along the inner edges thereof, a panel the side and top edges of which are clinched over the outer edges of said rails, said panel being provided in its upper portion with an opening, the sides and top of which are defined by inturned portions of the panel forming one side and the base walls of upper glass run channels, and a molding member detachably secured to said reversely bent portions of the side and top rails, said molding member constituting the opposite side walls of said glass run channels.

4. In a door for closed vehicle bodies, a window frame comprising a rail having a main transversely extending body portion of web cross-section and an outer door overlap flange, a panel strip stamping secured along one edge to said overlap flange and having its other edge portion extended inwardly and provided with an angle shaped extremity, the arms of which form a side and the bottom wall of a glass receiving channel, said bottom wall being spaced from the body web portion of the rail, and a longitudinally extending member interconnecting the said angle shaped extremity of the panel and the body web portion of the rail, throughout a substantial portion of the extent of said rail.

5. In a door for closed vehicle bodies, a window frame comprising a rail having a main transversely extending body portion of web cross section and an outer lateral flange, a panel strip secured along one edge to said flange and turned inwardly of the door and terminating along its other edge in an angle section portion spaced from the main body web of the rail and forming a side and the bottom of a glass receiving channel, and a longitudinally extending angular strip secured through one branch thereof to the angle section portion of the panel strip and through another branch thereof to the main body web of the rail.

6. An automobile door construction comprising a metal side rail having a transversely extending body portion of web cross section, and extending the full length of the door, and a glass run channel having offset portions spacing its main body from the web of the rail, and secured directly to the web of the rail through said offset portions.

In testimony whereof he hereunto affixes his signature.

JOSEPH LEDWINKA.